US011075980B2

(12) United States Patent
Bacher et al.

(10) Patent No.: US 11,075,980 B2
(45) Date of Patent: Jul. 27, 2021

(54) METHOD FOR OPERATING A NODE CLUSTER SYSTEM IN A NETWORK AND NODE CLUSTER SYSTEM

(75) Inventors: Utz Bacher, Schoenbuch (DE); Einar Lueck, Stuttgart (DE); Viktor Mihajlovski, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/453,095

(22) Filed: Apr. 23, 2012

(65) Prior Publication Data

US 2012/0209937 A1   Aug. 16, 2012

Related U.S. Application Data

(63) Continuation of application No. 13/307,574, filed on Nov. 30, 2011, now abandoned.

(30) Foreign Application Priority Data

Dec. 14, 2010   (EP) .................................... 10194836

(51) Int. Cl.
*G06F 15/16*      (2006.01)
*H04L 29/08*      (2006.01)
*H04L 29/12*      (2006.01)

(52) U.S. Cl.
CPC ...... *H04L 67/1002* (2013.01); *H04L 61/6063* (2013.01)

(58) Field of Classification Search
CPC ....... H04L 29/08072; H04L 2012/5667; H04L 29/06; H04L 63/1416; H04L 41/0213;

(Continued)

(56) References Cited

U.S. PATENT DOCUMENTS 6,006,259 A    12/1999 Adelman
6,549,538 B1 *  4/2003 Beck et al. .............. 370/395.52
(Continued)

FOREIGN PATENT DOCUMENTS

CA       2753747 A1    6/2012
CN    101795238 B  *  8/2012

OTHER PUBLICATIONS

Rahul Khanna, Self-Organization of Wireless Sensor Network for Autonomous Control in an IT Server Platform, Jul. 1, 2010, IEEE (Year: 2010).*

(Continued)

*Primary Examiner* — Tonia L Dollinger
*Assistant Examiner* — Schquita D Goodwin
(74) *Attorney, Agent, or Firm* — Jay Wahlquist

(57) ABSTRACT

Operating a node cluster system with a plurality of nodes in a network, wherein the cluster system appears to be a single node with only one specific network address to its network environment. Providing a shared socket database for linking network connection port identifications of a common set of network connection port identifications to the individual nodes, assigning a master function to one of the nodes, sending incoming traffic to all nodes of the cluster system wherein each node verifies its responsibility for this traffic individually, exclusive assignment of a network connection port to the responsible node for the duration of a connection of the corresponding application process by means of the corresponding network connection port identification and the link established by the shared socket database and processing of the traffic by the responsible node or otherwise by the node having the master function.

9 Claims, 5 Drawing Sheets

(58) Field of Classification Search
CPC ............ H04L 67/1002; H04L 61/6063; H04M 1/72527; Y02B 60/50
USPC ............ 709/208, 223, 221, 217; 370/295.52, 370/401; 726/22
See application file for complete search history.

(56) References Cited

U.S. PATENT DOCUMENTS

| | | | |
|---|---|---|---|
| 7,031,275 B1* | 4/2006 | Borella | H04L 29/12924 370/328 |
| 7,051,115 B2 | 5/2006 | Chen | |
| 7,228,350 B2* | 6/2007 | Hong | H04L 29/06 370/389 |
| 7,376,743 B1* | 5/2008 | Bazzinotti | H04L 12/4641 370/236 |
| 7,685,223 B1* | 3/2010 | Basavaiah | H04L 67/16 709/200 |
| 7,881,208 B1* | 2/2011 | Nosella | H04L 29/12028 370/220 |
| 8,041,761 B1* | 10/2011 | Banga | G06F 9/5077 705/51 |
| 8,472,447 B2* | 6/2013 | Humphries | H04L 12/185 370/392 |
| 8,958,419 B2* | 2/2015 | Cummings | H04L 49/109 370/360 |
| 2002/0156613 A1* | 10/2002 | Geng | H04L 12/28 703/23 |
| 2002/0165964 A1* | 11/2002 | Chen | H04L 12/1886 709/226 |
| 2003/0065741 A1 | 4/2003 | Vo | |
| 2004/0022255 A1* | 2/2004 | Chen et al. | 370/401 |
| 2004/0143654 A1* | 7/2004 | Poirot et al. | 709/223 |
| 2005/0044227 A1* | 2/2005 | Haugh | H04L 29/06 709/226 |
| 2005/0246569 A1 | 11/2005 | Ballew | |
| 2006/0161980 A1* | 7/2006 | Huitema | H04L 63/14 726/22 |
| 2006/0215556 A1* | 9/2006 | Wu | H04W 4/12 370/230 |
| 2008/0019265 A1 | 1/2008 | Alluisi | |
| 2008/0186968 A1* | 8/2008 | Farinacci | H04L 12/4633 370/392 |
| 2008/0222266 A1* | 9/2008 | Banerjee et al. | 709/208 |
| 2008/0320117 A1* | 12/2008 | Johnsen | H04Q 1/035 709/221 |
| 2009/0113018 A1* | 4/2009 | Thomson et al. | 709/208 |
| 2009/0154471 A1* | 6/2009 | Kim | H04L 12/2856 370/395.53 |
| 2009/0276842 A1* | 11/2009 | Yevmenkin | H04L 67/1002 726/13 |
| 2010/0162036 A1* | 6/2010 | Linden | G06F 11/181 714/4.11 |
| 2010/0189117 A1* | 7/2010 | Gowda | H04L 12/66 370/401 |
| 2011/0228669 A1* | 9/2011 | Lei | H04L 45/00 370/219 |
| 2011/0231508 A1* | 9/2011 | Torii | H04L 29/12028 709/208 |
| 2011/0236013 A1* | 9/2011 | Gazzola | H04J 14/0258 398/5 |
| 2011/0271112 A1* | 11/2011 | Bajko | H04L 29/12924 713/168 |
| 2012/0084420 A1* | 4/2012 | Ayanam | H04L 12/6418 709/223 |
| 2012/0151018 A1* | 6/2012 | Bacher | H04L 67/1002 709/220 |
| 2016/0162036 A1 | 6/2016 | Shi | |

OTHER PUBLICATIONS

List of IBM Patents and Patent Applications Treated as Related, May 27, 2019. 2 pages.
Office Action dated May 22, 2018 for Canadian Patent Application No. 2,753,747 filed Sep. 30, 2011.
Office Action dated May 30, 2017 for Canadian Patent Application No. 2,753,747 filed Sep. 30, 2011.

* cited by examiner

METHOD FOR OPERATING A NODE CLUSTER SYSTEM IN A NETWORK AND NODE CLUSTER SYSTEM

FIELD OF THE INVENTION

The present invention relates to a method for operating a node cluster system with a plurality of nodes in a network, wherein the cluster system appears to be a single node with only one specific network address to its network environment. The invention also relates to a computer-readable medium, such as a storage device: a floppy disk, CD, DVD, Blue Ray disk or a random access memory (RAM), containing a set of instructions that causes a computer to perform the above-mentioned method. Further, the invention relates to a computer program product comprising a computer usable medium including computer usable program code, wherein the computer usable program code is adapted to execute the above method. The invention further relates to a corresponding node cluster system comprising a plurality of nodes, wherein, to a network environment of the node cluster system, these nodes appear to be a single node with only one specific network address.

BACKGROUND

An ensemble of nodes that appear to be a single node to a network environment with only one specific IP address of this ensemble, is known. Today's approaches are based on masking the IP address through a central sprayer or designated node so that an ensemble of nodes appears as a single entity within a network.

U.S. Pat. No. 7,051,115 B2 discloses a method of providing a single system image in a clustered environment. An internet protocol (IP) address is assigned as a cluster IP address. The cluster IP address is bound to a node in a cluster. A client request directed to the cluster IP address is received in the node. The node multicasts the request to all nodes in the cluster. A dynamically adjustable workload distribution function filters the request, wherein the function is configured to allow a single node to process the client request.

SUMMARY

It is an object of the invention to provide an operation method of a node duster system and a corresponding node cluster system comprising a plurality of nodes with improved manageability.

This object is achieved by the independent claims. Advantageous embodiments are detailed in the dependent claims.

The method according to the invention comprises the following steps: (a) providing a shared socket database for linking (binding) network connection port identifications of a common shared set of network connection port identifications to the individual nodes, (b) assigning a master function to one of the nodes, (c) sending incoming traffic to all nodes of the cluster system, wherein each node verifies its responsibility for this traffic individually, (d) exclusive assignment of a network connection port to the responsible node for the duration of a connection of the corresponding application process (application) by means of the corresponding network connection port identification and the link established by the shared socket database and (e) processing of the traffic by the responsible node or otherwise by the node having the master function. Opening a socket on an individual node involves binding of network connection port identifications to said node. The common set of network connection port identifications is a shared port identification space; specifically, a shared port number space. Due to the method of the invention, the node cluster system is advantageously manageable, like a single node, with only one specific network address by its system administrator.

The basic idea of the invention is to operate the node cluster system comprising the plurality of nodes by setting up incoming traffic distribution to all nodes in a "mirrored" fashion: incoming traffic to the cluster system is sent to all nodes of the cluster system. Each one of the nodes contains the same network address (more specifically, carries the same MAC address, VLAN and IP address) and verifies its responsibility for this traffic separately by use of the shared socket database. The shared socket database also ensures that a network connection port is never used by more than one node. The responsibility of the node having the master function (master node) further includes the processing of incoming traffic for which no other node is responsible. Processing of incoming traffic pertaining to diagnostics and/or administration is/are performed by the node having the master function. This traffic includes handling related to non-existent sockets (rejection of sockets), diagnostic and administrative traffic, e.g. ICMP or ARP handling (ICMP: Internet Control Message Protocol; ARP: Address Resolution Protocol).

In data communication, a node (physical network node) is an addressable electronic unit, e.g. an electronic device, attached to a network, which unit is capable of sending and/or receiving and/or forwarding information (traffic) over a communications channel. The node may either be data circuit-terminating equipment (DCE), such as a modem, hub, bridge or switch; or data terminal equipment (DTE), such as a digital telephone handset, a printer or a host computer, for example a router, a workstation or a server.

The nodes of the cluster system, according to the invention, have identical network addresses, especially identical MAC addresses (MAC: Media-Access-Control). Also, the nodes further have identical IP (Internet Protocol) and VLAN (Virtual Local Area Network) settings. A port space for TCP ports and UDP ports relevant to the IP address of said nodes is shared across all nodes.

In a preferred embodiment of the present invention, the traffic includes a connection request for a listening socket on the plurality of nodes, wherein the traffic causes the responsible node to send a request for reservation of a corresponding network connection port identification to the shared socket database followed by a check, whether the reservation request is successful.

Incoming traffic requesting established connections causes a processing of said traffic on the corresponding node or otherwise processing on the node having the master function by sending a response.

In a further preferred embodiment of the present invention, the individual verification of the responsibility for incoming traffic is performed by a respective operating system of each individual node.

Outgoing traffic may be caused by one of said nodes establishing a socket to another network destination.

According to another preferred embodiment of the present invention, the assigning of the network connection port identification to the node on which an application requests for an outgoing connection is performed by applying an auto-binding procedure by looking sequentially for the next available network connection port.

According to another preferred embodiment of the present invention, the assigning of the network connection port identification to the node on which an application process requests for an outgoing connection is optimized by assigning different network connection port ranges to individual nodes and by applying an auto-binding procedure, by looking sequentially for the next available network connection port in said network connection port ranges. This assigning of the network connection port identification to said node is optimized in a way that each node is granted a pool of available ports. This reduces the likeliness of collisions, if two (2) nodes want to open an outgoing connection at the same time. Also, this allows for optimizations to assume no collisions will appear, reducing locking requirements.

According to yet another preferred embodiment of the present invention, the specific port is a TCP/IP-port, UDP/IP-port, TCPv6/IPv6-port or UDPv6/IPv6-port with the corresponding network connection port identification being a TCP/IP-port number, UDP/IP-port number, TCPv6/IPv6-port number or UDPv6/IPv6-port number. The Transmission Control Protocol (TCP) and the User Datagram Protocol (UDP) are members of the Internet Protocol Suite, the set of network protocols used for the Internet. TCP/IP is named from the two protocols: the Transmission Control Protocol (TCP) and the Internet Protocol (IP). UDP/IP is named from the two protocols: the User Datagram Protocol (UDP) and the Internet Protocol (IP).

According to another preferred embodiment, failure of nodes not holding the master function (worker nodes) is tolerated. Failure is detected through state of the art mechanisms, e.g. heartbeating. Upon failure of a worker node, all socket entries of the failed node are removed from the shared database. The nodes network connection ports will be kept reserved for some duration of time, so that existing connections to the failed node will time out. After some time, the network connection ports will be freed for use by other nodes.

According to yet another preferred embodiment, failure of the node holding the master function (master node) is tolerated. Failure is detected through state of the art mechanisms, e.g. heartbeating. Upon failure of the master node, the master function is taken over by another node. This can be done through following a well-defined order, according to utilization information, or following state-of-the art quorum services. Existing sockets of the failed node will be removed, blocked and made available for use again after some time, as described in the previous preferred embodiment.

According to another preferred embodiment, the master function is assumable by several nodes simultaneously by distinguishing between various kinds of responses of the master function and splitting responsibility according to said kinds of responses on said nodes. In other words, the master function can be distributed on several nodes, to reduce the master nodes workloads. This can be done by traffic type, e.g. that one master node handles ARP traffic, another master node handles ICMP traffic and yet another master node handles to-be-rejected socket requests.

According to another preferred embodiment, a listening TCP or TCPv6 socket can be implemented by several nodes. All nodes serving a listening socket have to follow the same pattern (e.g. through a hashing function) to find out which one node will serve the socket. This specific node will handle this connection from this point on, while all other nodes ignore packets for this connection.

The invention further relates to a computer-readable medium, such as a storage device, a floppy disk, CD, DVD, Blue Ray disk or a random access memory (RAM), containing a set of instructions that causes a computer to perform an aforementioned method and a computer program product comprising a computer usable medium including computer usable program code, wherein the computer usable program code is adapted to execute the aforementioned method.

With respect to the node cluster system, the aforementioned object is achieved by a shared socket database for linking network connection port identifications of a common shared set of network connection port identifications to the individual nodes, a role manager for assigning a master function to one of the nodes and an interface connecting each of the nodes to the network environment for passing incoming traffic to each node of the cluster system, wherein each node is configured to verify its responsibility for incoming traffic to the node cluster system individually. The node cluster system is a node cluster system for carrying out the aforementioned operation method. The exclusive assignment of a port to the responsible node for the duration of a connection of the corresponding application process is performed by means of the corresponding network connection port identification and the link established by the shared socket database and the processing of the traffic is performed by the responsible node or otherwise by the node having the master function. The interface preferably contains a switch, connecting the outside network to the plurality of nodes. The node cluster system according to the invention is advantageously manageable like a single node with only one specific network address by its system administrator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. More specific examples (a non-exhaustive list) of the computer readable storage mediums would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language, such as Java, Small talk, C++ or the like, and conventional procedural programming languages, such as the "IC" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that the instructions that execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

BRIEF DESCRIPTION OF THE DRAWINGS

Preferred embodiments of the invention are illustrated in the accompanying figures. These embodiments are merely exemplary, i.e. they are not intended to limit the content and scope of the appended claims.

DETAILED DESCRIPTION

Figure 1:
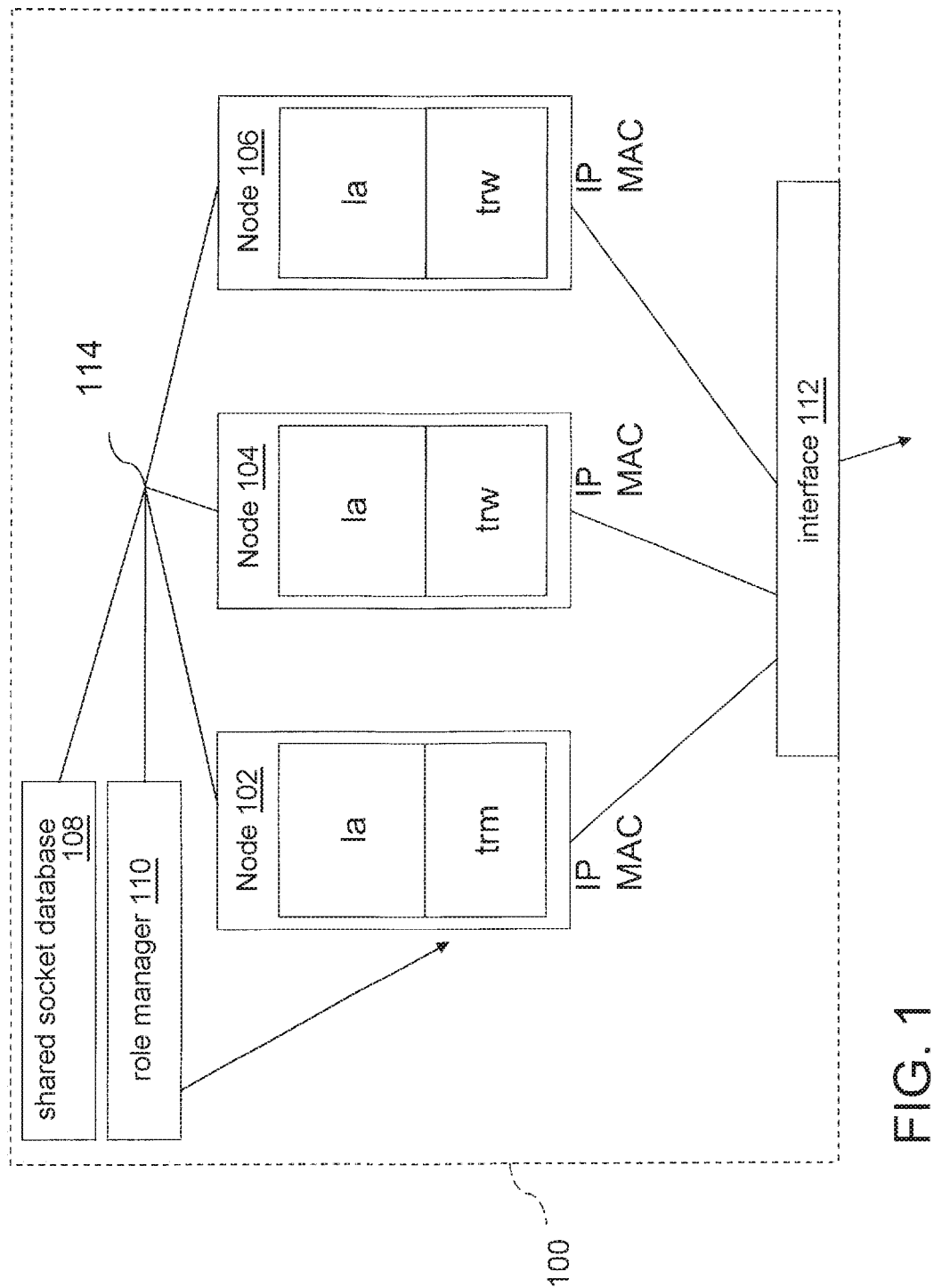
FIG. 1 shows a schematic representation of a node cluster system according to a preferred embodiment of the present invention.

FIG. 1 shows a node cluster system 100 comprising a plurality of nodes 102, 104, 106, wherein this node cluster system 100 has a single specific network address being an IP address. The cluster system 100 further comprises a shared socket database 108 for binding of network connection port identifications to the nodes 102, 104, 106, a role manager 110 (sometimes called master/worker role manager) for assigning a master function to one of the nodes 102, 104, 106, and the operating system (OS) of the individual nodes for performing an individual verification of the responsibility for incoming traffic. Inside the cluster system 100, the nodes 102, 104, 106, the shared socket database 108, and the role manager 110 are connected via a sideband connectivity 114 of the cluster system 100 (separate physics or via different MAC/IP addresses). The role manager 110 assigns the master function to one of the nodes 102, and worker function to the other nodes 104 and 106. The shared socket database keeps track of all sockets regardless of their states (LISTEN, SYN-SENT, SYN-RECEIVED, ESTABLISHED, FIN-WAIT-1, FIN-WAIT-2, CLOSE-WAIT, CLOSING, LAST-ACK, TIME-WAIT) of the nodes 102, 104, 106 and comprises information on the TCP, UDP, TCPv6 or UDPv6 port being used and the individual node (102, 104 or 106) the socket is handled on.

An interface 112, especially a switch of said interface, is connecting each of the nodes 102, 104, 106 to other nodes of a network outside the cluster system 100.

The nodes 102, 104, 106, the shared socket database 108 and the role manager 110 are interconnected by sideband connectivity 114 organized as separate physics or via different MAC/IP addresses.

In each of the nodes 102, 104, 106 a local agent 1a with access to the socket database 108 and corresponding traffic rules trm, trw (trim traffic rules for the node being the master; trw: traffic rules for the node(s) being ordinary workers) is implemented. The role manager indicates the master function (master role) by an indicator I. In the example shown in FIG. 1, the first node 102 has the master function, while nodes 104 and 106 have to perform the worker function of worker nodes.

The interface 112 connects each of the nodes 102, 104, 106 to the network environment for passing incoming traffic to each node 102, 104, 106 of the cluster system 100.

Each node 102, 104, 106 is configured to verify its responsibility for incoming traffic to the node cluster system 100 individually. The individual verification of the responsibility for incoming traffic is performed by a respective OS of each individual node 102, 104, 106 separately.

Figure 4:
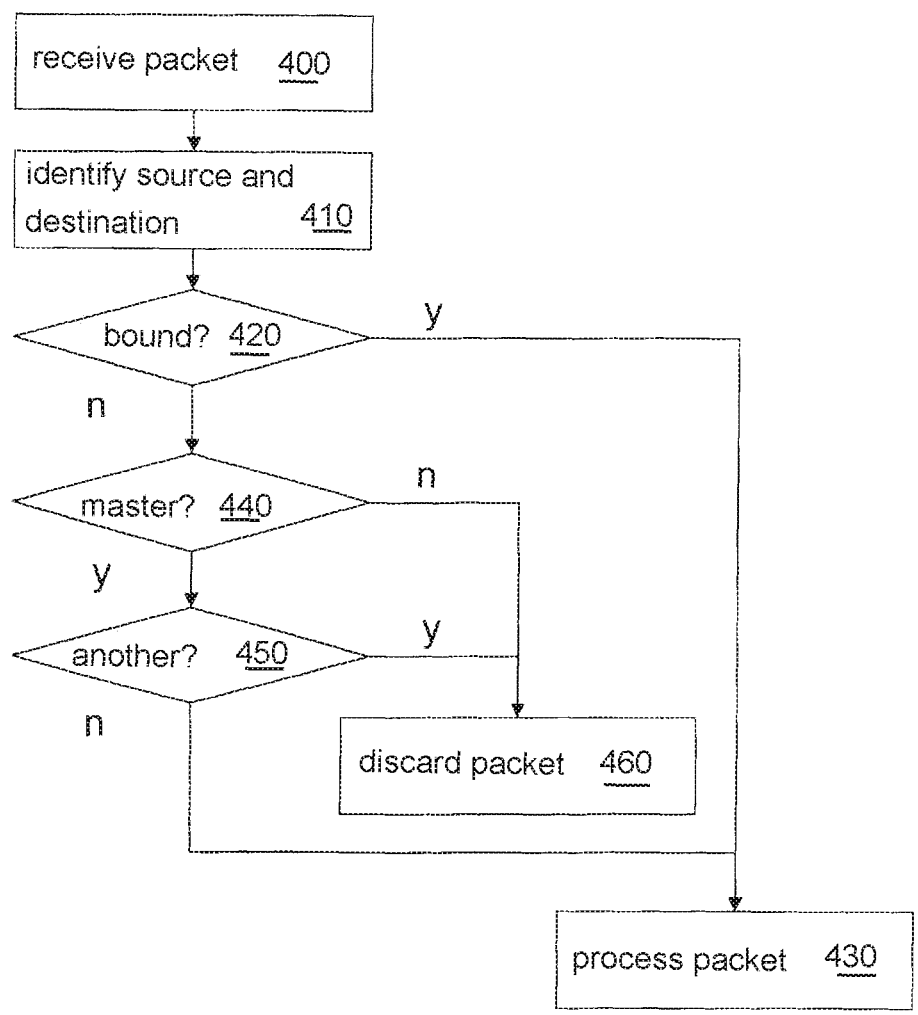
FIG. 4 shows a flowchart of processing connections (incoming traffic not related to connection requests)
Figure 5:
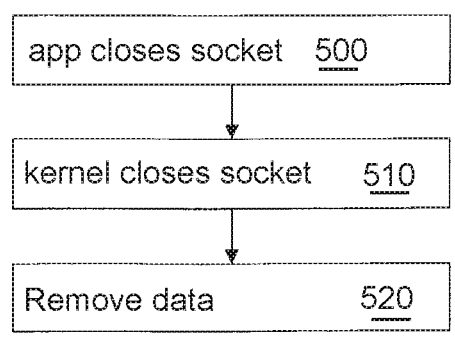
FIG. 5 shows a flowchart of a process closing a socket.

The following examples will show processes for opening different sockets (FIGS. 2 and 3), a process for processing connections (incoming traffic not related to connection requests—FIG. 4) and a process of closing a socket (FIG. 5).

Figure 2:
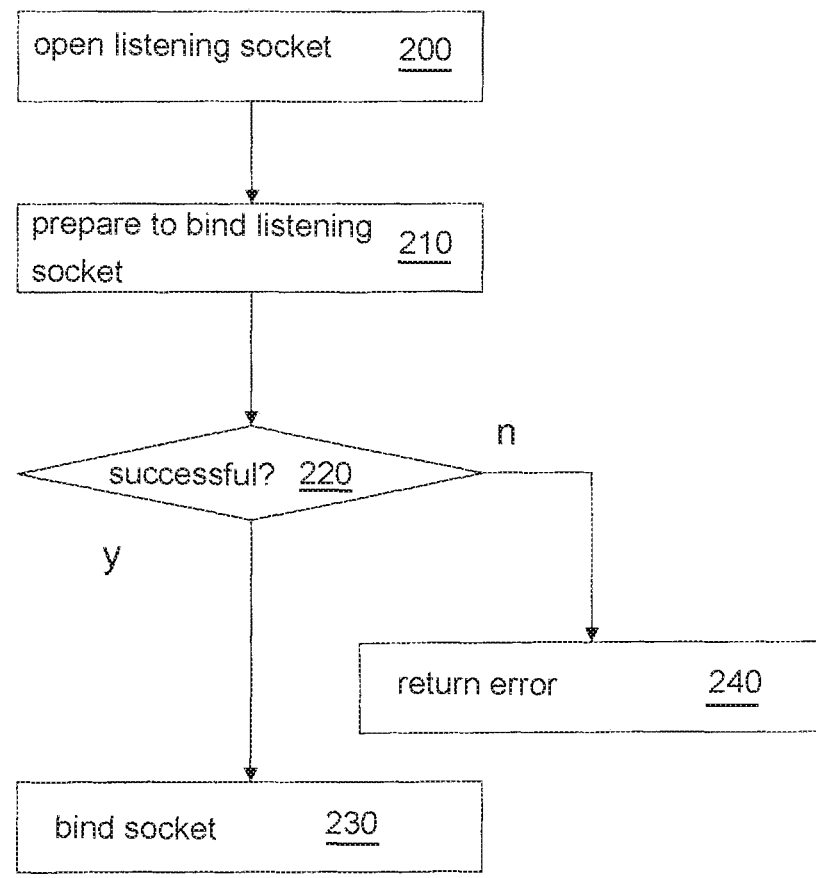
FIG. 2 shows a flowchart of a process for opening (creating) a listening socket (preparing to receive and process incoming connection requests)

FIG. 2 shows a flowchart of an application opening a listening socket, e.g. a Web server starts up and listens for incoming connections. This application can be performed on each node 102, 104, 106 individually; however, only the first application and node to request on the listing socket on the designated port will succeed.

Block 200 is representing a step (Step 200) wherein the application opens and binds a listening socket to a specified TCP or UDP source port number. This is triggered through the socket call "bind".

In step 210, the kernel of the operating system (OS kernel) prepares to bind the listening socket to the specified TCP or UDP source port number. The kernel sends a reservation request to the shared socket database 108, reserving the specified TCP or UDP source port number for this listening socket on this node.

Step 220 is a decision step, wherein the kernel checks whether the reservation request is successful. This depends on whether the TCP or UDP port number is in use already for this IP address on any node 102, 104, 106.

If the TCP or UDP source port reservation is successful (path y: yes), the OS kernel continues to bind the socket to the specified TCP or UDP source port number (step 230). After this, the socket is bound and can be used for sending and receiving traffic. The application has returned a value indicating success of the operation. Otherwise, if the TCP or UDP source port reservation is not successful (path n: no), the kernel returns an error message to the application, indicating that the bind operation failed (step 240).

Figure 3:
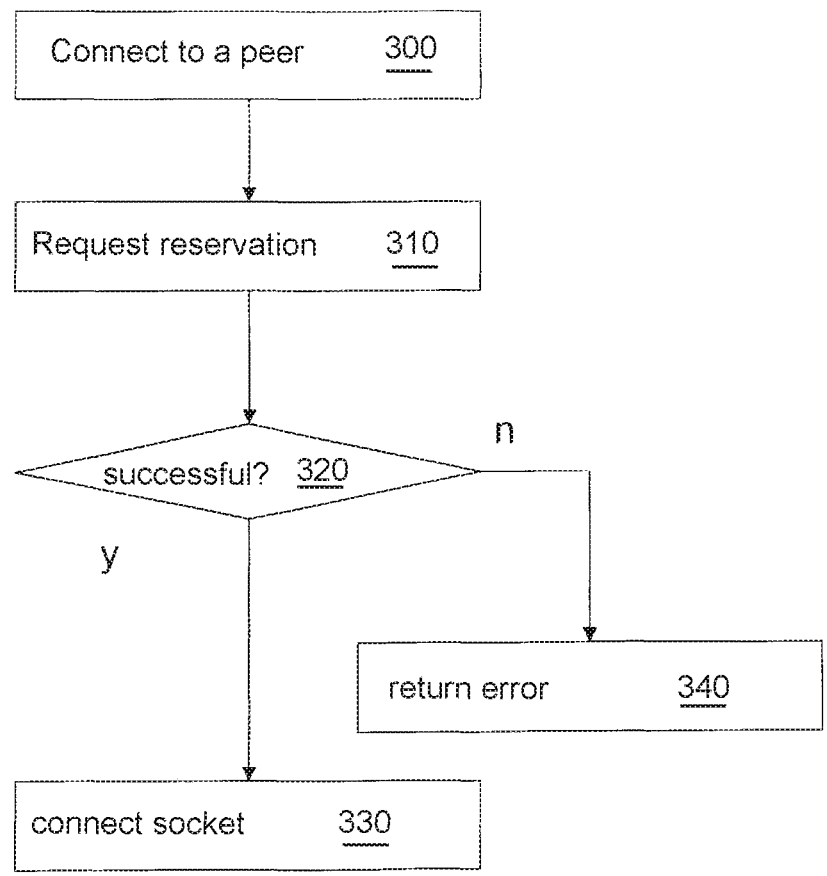
FIG. 3 shows a flowchart of a process for opening (creating) a connection socket (opening a connection for outgoing traffic)

FIG. 3 shows a flowchart of an application connecting to a peer (e.g. an application server connects to a database server). This application can be performed on each node 102, 104, 106 individually.

Step 300 is a step wherein the application connects to a peer (specified by a destination IP address and a TCP or UDP destination port number). This is triggered through the socket called "connect" and implies that the socket is locally bound to a local TCP or UDP source port number.

In step 310, the OS kernel requests reservation of an available TCP or UDP source port number for this socket from the shared socket database. This checking and reserving is done automatically on the shared socket database 108.

Step 320 is a decision step, wherein the kernel checks whether the reservation request is successful. This depends on whether an available TCP or UDP source port number has been found or all ports are in use by other sockets.

If the TCP or UDP source port reservation was successful (path y: yes), the kernel continues to auto-bind and to connect the socket. This is done by associating the destination IP address and TCP or UDP destination port number with this socket at the shared socket database 108. After this, the socket can be used for sending and receiving traffic. The application has returned a value indicating success of the operation (step 330). If the TCP or UDP source port reservation is not successful (path n: no), the kernel returns an error message to the application, indicating that the operation failed (step 340).

FIG. 4 shows a flowchart of the process that is executed if a network packet is received by the nodes 102, 104, 106. This process will be executed on all nodes 102, 104, 106 individually. All of the nodes 102, 104, 106 receive the same packet as they exhibit the same MAC address.

Step 400 is the starting step of this process, wherein a network packet is received on the specific node this flow is running on. In the following operation, step 410, the protocols of the network packet are decoded and the IP source and destination addresses and the TCP or UDP source and destination port numbers are identified.

Step 420 is a decision step, wherein the shared socket database 108 is queried, whether the socket (designated by source and destination IP addresses and source and destination TCP or UDP port numbers) is bound to the node 102, 104 or 106 this flow/procedure is running on.

If the socket is bound to said node (path y: yes), the packet is processed in step 430. If the socket is not bound to said node 102, 104, 106 (path n: no), within the further decision step 440 it is determined whether the individual node 102, 104 or 106 this flow is running on has the master function (master role). Only the node with the master function 102 takes care of administrative traffic. In this case, it is responsible for appropriate handling of the packet (e.g. rejecting the request, ICMP traffic, ARP packets), which is done later in step 430. If the node 102, 104, 106 this flow is running on has the master function (path y: yes), the flow will continue with step 450. If the node 102, 104, 106 this flow is running on has no master function (path n: no), the packet is discarded. Another node 102, 104, 106 will process it (this flow will run into step 430 on that node).

Step 450 is a decision step, wherein the shared socket database 108 is queried, whether the socket (designated by source and destination IP addresses and source and destination TCP or UDP port numbers) is bound on any node 102, 104, 106. If the socket is bound to another node 102, 104, 106 (path y: yes), the packet is discarded and this other node 102, 104, 106 will process the packet (this flow will run into step 430 on that other node).

Processing the packet in step 430 can mean that the packet is passed to the matching socket (coming from step 420) and, thus, the appropriate application, or, in case of a packet not belonging to any socket on any node AND in case that the node this flow runs on is the master node (coming from step 440 via step 450) appropriate negative response.

If the application sends data, this is done without further synchronization. The packet is simply sent by the node 102, 104, 106 that the application sending data runs on.

FIG. 5 shows a flowchart of the process that is executed if the application closes a socket. The closing of a socket can, e.g. be a shutdown of a Web server, or an application terminating a connection to another network host.

Step 500 is the starting step of this process, wherein the application closes the socket. This is triggered through the socket call "close", which is passed to the kernel of the OS.

In the following step 510, the OS kernel closes the socket and removes all data associated with it. The kernel also sends a message to the shared socket database 108 to remove this socket.

In the following step 520, the shared socket database 108 removes all data for that socket. The pair of TCP or UDP source and destination ports can be used by new connections from this point on.

The flowchart and block diagrams in the Figs. illustrate the architecture, functionality and operation of possible implementations of systems, methods and computer program products according to various embodiments of the present invention. In this regard, each block in the flowchart or block diagram may represent a module, segment or portion of code that comprises one or more executable instructions for implementing the specified logical function(s). It should also be noted that, in some alternative implementations, the functions noted in the block may occur out of the order noted in the Figs. For example, two (2) blocks shown in succession may, in fact, be executed substantially concurrently or the blocks may sometimes be executed in the reverse order, depending upon the functionality involved. It will also be noted that each block of the block diagrams and/or flowchart illustrations and combinations of blocks in the block diagrams and/or flowchart illustrations can be implemented by special purpose hardware-based systems that perform the specified functions or acts or combinations of special purpose hardware and computer instructions.

What is claimed is:

1. In a communications network including a node cluster having a plurality of nodes, but said cluster having a single network address, a method of transmission comprising:
providing a shared socket database for linking network connection port identifiers for each of a common shared set of network port identifiers for respective connection to each of said plurality of nodes, wherein each of the plurality of nodes has a same Media Access Control (MAC) address, a same Internet Protocol (IP) address, and a same Virtual Local Area Network (VLAN) address such that each incoming data transmission is sent to all of the plurality of nodes wherein each of the nodes is connected to the shared socket database via sideband connectivity;
assigning a master function to one of said plurality of nodes, wherein the other nodes in said plurality of nodes are worker nodes; and
for each respective incoming data transmission:
determining, at each respective node of the plurality of nodes, if the respective node is responsible for the respective incoming data transmission based on the linked network connection port identifiers in the shared socket database;
in response to one of the worker nodes determining that it is responsible for the respective incoming data transmission, processing the respective incoming data transmission in the responsible worker node, wherein the responsible worker node is assigned exclusive connection to the communications network from an identified network port corresponding to the responsible worker node in the shared socket database; and
in response to determining that none of the worker nodes are responsible for the respective incoming data transmission, processing the respective incoming data transmission in the node assigned the master function.

2. The method of claim 1, further including, responsive to a request for said shared socket database, said responsible worker node requesting a reservation of the corresponding identified network port to said shared socket database, and providing a confirmation of the reservation.

3. The method of claim 1, further including establishing an outgoing connection from one of said plurality of worker nodes and another network destination through said shared socket database, wherein outgoing data may be transmitted.

4. The method of claim 3, wherein said outgoing connection is established, responsive to an application being processed, by automatically sequentially seeking the next available network connection port.

5. The method of claim 4 includes assigning different network connection port ranges to each of said plurality of worker nodes, and by automatically looking sequentially for the next available network connection port within said ranges.

6. The method of claim 1, further including reassigning the master function to another one of said plurality of nodes in the event of failure of the node to which the master function is originally assigned.

7. The method of claim 1, further including, in the event of failure of the node to which exclusive connection is assigned:
removing all entries of said failure node from the shared socket database;
reserving the linked network connection port identifiers of said entries for a predetermined time period; and
releasing said reserved network connection port identifiers for use by any of said plurality of nodes after said time period.

8. In a communications network including a node cluster having a plurality of nodes, but said cluster having a single network address, a system for transmission comprising:
a plurality of nodes, wherein one of the plurality of nodes is a master node and the other nodes of the plurality of nodes are worker nodes, each of the plurality of nodes comprising a processor and a memory storing computer program instructions for execution by the processor; and
a shared socket database coupled to each of the plurality of nodes via sideband connectivity for linking network connection port identifiers for each of a common shared set of network port identifiers for respective connection to each of said plurality of nodes, wherein each of the plurality of nodes has a same Media Access Control (MAC) address, a same Internet Protocol (IP) address, and a same Virtual Local Area Network (VLAN) address such that each incoming data transmission is sent to all of the plurality of nodes;
wherein each respective worker node of the plurality of worker nodes is configured to:
access the shared socket database to determine, for each incoming data transmission, if the respective worker node is responsible for the respective incoming data transmission based on the linked network connection port identifiers in the shared socket database; and
process the respective incoming data transmission in response to determining that the respective worker node is responsible for the respective incoming data transmission, wherein the responsible worker node is assigned exclusive connection to the communications network from an identified network port corresponding to the responsible worker node in the shared socket database; and
wherein the master node is configured to process each respective incoming data transmission for which none of the worker nodes are responsible based on the linked network connection port identifiers in the shared socket database.

9. In a communications network including a node cluster having a plurality of nodes, a method comprising:
receiving a network packet at each of the plurality of nodes;
identifying, at each respective node of the plurality of nodes, an internet protocol (IP) source address, an IP destination address, a source port number, and a destination port number for the received network packet, wherein each of the plurality of nodes has a same Media Access Control (MAC) address, a same Internet Protocol (IP) address, and a same Virtual Local Area Network (VLAN) address such that each incoming data transmission is sent to all of the plurality of nodes;
individually querying, by each respective node of the plurality of nodes, a shared socket database coupled to the plurality of nodes via sideband connectivity to determine if a socket designated by the IP source address, the IP destination address, the source port number, and the destination port number of the received network packet is bound to the respective node;

in response to determining that the socket is bound to the respective node, processing the received network packet in the respective node, wherein the responsible worker node is assigned exclusive connection to the communications network from an identified network port corresponding to the responsible worker node in the shared socket database;

in response to determining that the socket is not bound to the respective node, determining if the respective node is assigned a master function, wherein the master function is assigned to at least one of the plurality of nodes and the other nodes in the plurality of nodes not assigned the master function are worker nodes;

in response to determining that the respective node is not assigned the master function, discarding the received network packet by the respective node;

in response to determining that the respective node is assigned the master function, querying, by the respective node having the master function, the shared socket database to determine if the socket designated by the IP source address, the IP destination address, the source port number, and the destination port number of the received network packet is bound to another node of the plurality of nodes;

in response to determining that the socket is bound to another node of the plurality of nodes, discarding the received network packet by the respective node having the master function; and in response to determining that the socket is not bound to another node of the plurality of nodes, processing the received network packet in the respective node having the master function.

* * * * *